Feb. 25, 1969     J. H. MAKER     3,429,408
ACTUATOR SLEEVES FOR SPRING CLUTCH
Filed April 25, 1967
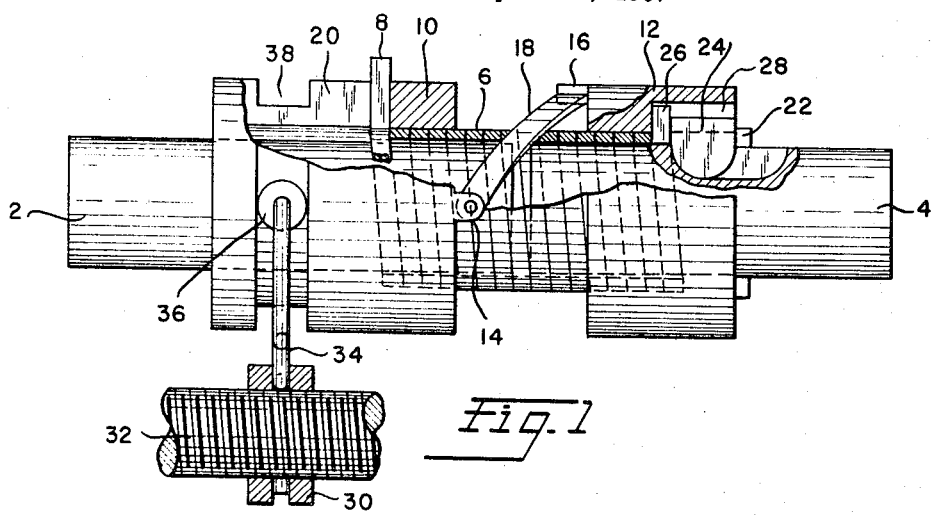
Fig. 1
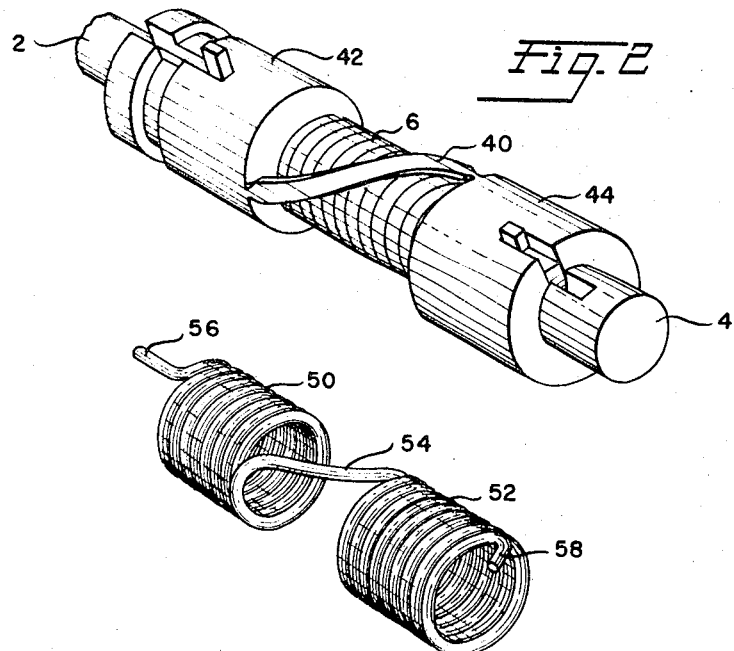
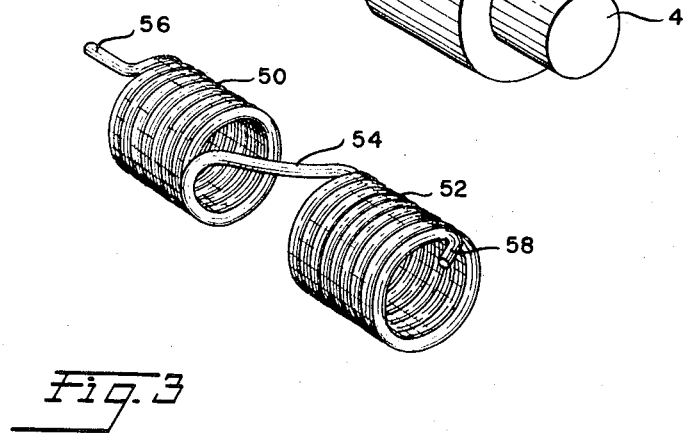
Fig. 3
INVENTOR
JAMES H. MAKER
BY
*Scrivener Parker Scrivener & Clarke*
ATTORNEYS

United States Patent Office 3,429,408
Patented Feb. 25, 1969

3,429,408
ACTUATOR SLEEVES FOR SPRING CLUTCH
James H. Maker, Bristol, Conn., assignor to Associated Spring Corporation, Bristol, Conn., a corporation of Delaware
Filed Apr. 25, 1967, Ser. No. 633,545
U.S. Cl. 192—81                                   6 Claims
Int. Cl. F16d *11/06, 13/04, 19/00*

ABSTRACT OF THE DISCLOSURE

Actuator for a clutch of the type in which the ends of a helical spring overlap the aligned ends of drive and driven shafts, the actuator comprising two sleeves which, respectively, overlap the two ends of the helical clutch spring, one actuator sleeve being fixed to the drive or driven shaft which it surrounds, and the other being mounted for axial or circumferential movement with respect to its shaft but being connected to the spring end which it surrounds. The adjacent, spaced ends of the actuator sleeves are connected by a strut, the ends of which are circumferentially displaced with respect to each other whereby axial movement of the movable actuator sleeve with respect to the fixed actuator sleeve produces circumferential movement of the movable actuator sleeve and its connected spring end, thereby connecting or disconnecting that spring from its shaft and drivingly connecting or disconnecting the shafts.

Summary of the invention

This invention relates to clutches for connecting aligned drive and driven shafts, of the type in which the ends of a helical coil spring extend over or within the ends of the shafts and at least one spring end is operated radially into or out of engagement with its associated shaft end in order to drivingly connect or disconnect the two shafts. In clutches of this type there is usually provided an actuator for moving one of the ends of the spring into or out of engagement with its associated shaft end. In operating the clutch, this actuator member is moved axially of the spring and is so connected to the spring that radial movement is imparted to the end of the spring to tighten or loosen it with respect to the shaft.

In the present invention there are two actuator members which, respectively, surround or are placed inside the spring ends. One of these actuator members is fixed from axial or rotary movement with respect to the shaft and spring end which it surrounds, while the other, which surrounds or is inside the other end of the spring is mounted for both axial and rotary movement with respect to the shaft and spring end which it surrounds. The adjacent but spaced ends of the two actuator members are connected by a strut the ends of which are displaced circumferentially of each other. When axial movement is imparted to the movable actuator member the reaction on it due to the displacement of the ends of the strut imparts circumferential movement to it which is transmitted to the end of the spring thereby tightening or loosening that end of the spring wih respect to its associated shaft, thereby drivingly connecting or disconnecting the two shafts.

Cross reference to related applications

This application is a substitute for the application of the same inventor filed Aug. 17, 1965, Ser. No. 480,435, for Spring Clutch, now abandoned.

Description of the drawings

FIG. 1 is a side view, partly in section, showing a spring clutch incorporating the actuator means provided by this invention;

FIG. 2 is a perspective view of a modified form of the clutch of FIG. 1, and

FIG. 3 is a perspective view of a second modified form of the invention.

Description of the invention

This invention provides an actuator for a clutch for connecting and disconnecting two axially aligned relatively rotatable shafts, the ends of which are spaced but may be closely adjacent to each other, one of which shafts is connected to and rotated by a source of power such as a motor and is referred to as the drive or input shaft, and the second of which is mounted for rotation with respect to the drive shaft and is connected to any mechanism which is to be operated, and is referred to as the driven shaft. The drive and driven shafts are shown, respectively, at 2 and 4 in FIGS. 1 and 2. Surrounding the adjacent, aligned ends of these two shafts is a helical spring 6 which, in the embodiment of the invention being described, is so wound that its inside diameter is less than the outside diameters of the adjacent ends of the drive and driven shafts, whereby the spring normally tightly engages the outer surfaces of both shafts and transmits rotational movement from the drive shaft to the driven shaft. One end of the spring coil is turned outwardly as shown at 8 to form a tang, and it will be apparent that by movement of the tang in one circumferential direction the inside diameter of the spring coil will be enlarged and this may be continued to an extent which will remove this end of the spring from the shaft end which it surrounds, thus disconnecting the two shafts.

Actuator means are provided by the invention for imparting such circumferential movement to tang 8, and such means comprises two aligned cylindrical members 10, 12 the inside diameters of which are such that the two members respectively fit over and receive the two ends of the spring 6, actuator member 10 surrounding that part of the spring which surrounds the drive shaft 2 while the other actuator member 12 is adapted to surround that part of the spring which engages the driven shaft 4. The two members 10, 12 are axially spaced and their facing ends are provided, respectively, with lugs 14, 16 which extend in a generally axial direction toward each other and are circumferentially displaced from each other by approximately 90° of arc in the embodiment of the invention being described. A connecting strut 18 extends between the lugs 14, 16 and is pivotally connected at its ends to the two lugs. The sleeve 10 which surrounds the part of the spring surrounding the drive shaft 2, and which is therefore adjacent the tang 8, is provided with an axial slot 20 which receives the radially outwardly extending tang 8 on the one end of the clutch spring 6, the slot being of such width that its side walls engage the tang without lost motion. The sleeve 10 is mounted on shaft 2 and on the end of spring 6 for rotary and axial movement with respect to both the shaft and spring.

The second actuator sleeve 12 is held from axial movement in a direction away from actuator sleeve 10 by an external annular shoulder 22 on shaft 4 which is constantly engaged by the outer end of actuator member 12, and this sleeve is also held from rotational movement on the shaft 4 and the clutch spring by a key connection 24 which is provided between actuator 12 and shaft 4. A tang 26 extends radially outwardly from the end of spring 6 which is within actuator sleeve 12 and is received within a slot 28 in the sleeve.

Means are provided by the invention for moving the actuator member 10 in an axial direction toward and away from the actuator member 12. These operating means can be of any suitable type or mode of operation and in the embodiment of the invention being described take the form of a nut 30 which is threaded to an operating shaft 32 which is parallel to shaft 2. The nut carries one end of a pivoted yoke 34 the other end of which carires a roller 36 which is positioned within a circumferential groove 38 in actuator sleeve 10. It will be apparent that by rotating shaft 32 in one direction or the other the resulting traverse of the nut 30 will be imparted to sleeve 10 to cause actuator member 10 to be moved axially of the shafts and with respect to the second actuator member 12. If actuator member 10 is moved toward actuator member 12, which is fixed and held from any corresponding movement, the connecting strut 18, the ends of which are displaced circumferentially with respect to each other, will react to such movement by exerting a force on lug 14, which is carried by actuator member 10, causing rotation of the actuator member 10. This movement will rotate tang 8, and in one direction of movement of nut 30 and sleeve 10 the inside diameter of that part of the clutch spring which surrounds shaft 2 will be increased. When this occurs the drive shaft 2 will rotate freely within the clutch spring and the two shafts will be disconnected, while movement of nut 30 in the opposite direction will cause the connecting member 18 to exert a force on actuator member 10 to return it to its normal position in which no force is exerted on tang 8 and the clutch spring will then tightly engage both the drive and driven shafts to transmit rotary movement from one to the other. As axial and rotary movement of actuator member 12 with respect to shaft 4 is prevented by shoulder 22 and key 24, the actuator member is therefore fixed to provide a solid abutment for the reaction of the connecting strut 18 on actuator member 10.

In FIG. 2 of the drawings there is shown a modified form which the actuator of FIG. 1 may take, in which the connecting strut 40 is integrally connected at its ends to the actuator sleeves 42, 44.

A third form which the actuator may take is disclosed in FIG. 3 of the drawings. In this form the entire actuator is formed from a single length of spring steel wire, with the two sleeves 50, 52 being closely wound helical springs and being connected by strut 54 formed by an open pitch coil which extends through only part of a full turn and which corresponds in function to the connecting strut 18 which is described above. The actuator member 50 has its outer end convolution deformed to provide a radial tang 56, and actuator member 52 is of such size that it has an interference fitting on the driven shaft or, alternatively, may be attached to that shaft by tang 58. This device is used both as the actuator and the helical clutch spring and corresponds in function to the actuator members and spring described above and shown in FIGS. 1 and 2.

The invention has been described and illustrated as embodied in a clutch which normally drivingly connects two shafts and which is operated to disconnect them. However, the invention is not limited in any way to a clutch of that type, but is applicable equally well to other types, including one in which the shafts are normally disconnected and are connected by operation of the clutch.

I claim:

1. An actuator for a clutch of the type comprising a helical coil spring mounted co-axially with driving and driven shafts with its end parts respectively surrounding the end parts of the shafts, an actuator comprising two axially spaced cylindrical parts which respectively surround the end parts of the spring and shafts, characterized in that a first one of said actuator parts is fixed from axial or rotary movement with respect to the shaft and spring which it surrounds and the second is mounted on the shaft and spring which it surrounds for axial and rotary movement with respect thereto and is connected to the end of its associated spring, a strut extending between the actuator parts and having its ends connected to said parts at circumferentially displaced points whereby axial movement of the movable actuator part with respect to the fixed actuator part produces a reaction through the strut on the movable actuator part to cause rotary movement thereof with respect to the fixed actuator part with consequent circumferential movement of the tang connected to the movable actuator part to change the internal diameter of the spring and thereby connect or disconnect the shafts.

2. A clutch according to claim 1, in which the strut is pivotally connected at its ends to the actuator parts.

3. A clutch acording to claim 1, in which the strut is integral at its ends with the actuator parts.

4. A clutch for connecting and disconnecting two adjacent aligned relatively rotatable shafts, comprising a helical coil spring mounted co-axially with the shafts with its end parts surrounding the end parts of the shafts and normally drivingly engaging both end parts, the outer end of one part of the spring being radially outwardly turned to provide a tang, means for moving the spring radially into and out of driving engagement with at least one of the shafts comprising a first actuator part surrounding that part of the spring which surrounds one of the shaft ends and having therein a slot through which the tang on the spring extends, a second actuator part surrounding that part of the spring which surrounds the other of the shaft ends, a connecting member extending between the two actuator parts and having its ends connected respectively to the two actuator parts at points displaced circumferentially with respect to each other whereby axial movement of the acuator part which engages the tang toward and away from the other actuator part causes rotary movement of the axially moved actuator part and the tang to thereby radially enlarge or diminish the internal diameter of the coil spring, and means for moving the axially movable actuator part toward and away from the other actuator part.

5. A clutch according to claim 4, in which the second actuator part is fixed from rotary or axial movement with respect to the spring and the shaft which it surrounds.

6. A clutch according to claim 4, comprising in addition a key connecting the second actuator part to the shaft which it surrounds to prevent relative rotational movement between them, and a shoulder on the shaft which is surrounded by the second actuator part and which engages the second actuator part to prevent axial movement thereof with respect to the shaft.

References Cited

UNITED STATES PATENTS

| 840,847 | 1/1907 | Henrici | 192—81 XR |
| 1,436,830 | 11/1922 | Sumner | 192—81 |
| 2,742,126 | 4/1956 | Morton | 192—41 |
| 2,895,578 | 7/1959 | Winchell | 192—81 XR |

BENJAMIN W. WYCHE, III, Primary Examiner.

L. J. PAYNE, Assistant Examiner.

U.S. Cl. X.R.

192—41, 94